G. C. Worth,
Harness,
N⁰ 36,930. Patented Nov. 11, 1862.
Witnesses:
C. Hadaway
Geo. H. Clarke
Inventor:
Guy C. Worth
By his attorney
C. B. Little

UNITED STATES PATENT OFFICE.

GUY C. WORTH, OF UPPER SANDUSKY, OHIO.

IMPROVED REIN-GUARD FOR HORSES.

Specification forming part of Letters Patent No. 36,930, dated November 11, 1862.

*To all whom it may concern:*

Be it known that I, GUY C. WORTH, of Upper Sandusky, in the county of Wyandot and State of Ohio, have invented an Improved Rein-Guard, to prevent horses from catching the reins or lines under their tails on being driven in harness; and I do hereby declare that the following is a full, clear, and exact description thereof, reference being had to the accompanying drawings, making a part of this specification, which represents the guard as applied to the harness.

The nature of my invention consists in the attachment to the hinder or rear part of the harness, to the reins or lines, or to the horse, of a device extending over the dock, over or through which device the reins pass on a direct line from the turret-eyes of the saddle or back-pad or hames to the hand of the driver, which device effectually prevents the horse from catching the reins or lines under his tail.

It also consists in the specific contrivance adopted by me for effecting this object.

To enable others skilled in saddlery and analogous arts to make and use my invention, I will proceed to describe its construction and operation.

Persons accustomed to driving horses in harness are aware that in their attempts to drive off flies that harass and nettle them they frequently catch the reins under their tails and hold them so firmly that it is difficult to extricate them, and in winter as well as in fly-time some horses have a trick of so catching the reins, of which it has been impossible to cure them. From this fact results great vexation to the driver, and often danger and injury to persons and property, for spirited horses are apt to become fractious in the attempt to release the reins, and an accident may happen before the effort is successful.

It is my object to provide a perfect remedy for this evil and its results, and although it is not my purpose to confine myself under the first head of my invention to any particular contrivance, so long as it is a device attached to the hinder part of the harness, to the reins, or to the horse, when the part which operates as a guard extends over a portion or the whole of the dock of the horse and partly or wholly under the reins or lines, yet it is proper that I should describe the specific method in which I have practically applied my invention.

I provide a light frame, A, composed of any suitable material and made to conform, more or less exactly, to the shape of the horse's rump, and furnish it on its front side or edge with a loop, B, by means of which and a strap and buckle or other fastening the said frame may be attached to the back-strap C of the harness, at the junction therewith of the crupper D; or, instead of the loop B or in addition to it, the corners E and E' of the frame may be flexibly attached to the hip-straps F and F' of the harness; or the frame may be attached to the harness or to the horse in any other manner deemed advisable; or it may be attached wholly to the reins by means of loops of leather or other suitable material, it being essential only that said frame or device should extend over the horse's dock about one-half or two-thirds its length. The frame A may also be provided on its rear side or edge with an eye or eyes, G and G'—although these are not necessary to the effective operation of my invention viewed simply as a rein-guard, though it or they are in its secondary aspect, which will be referred to in speaking of the operation of the guard—through and guided by which the reins H and H' pass. The frame A may, moreover, or not, be covered with thin cloth or with net-work of thread, twine, leather, or wire I, and when so covered the said rein-guard becomes in a greater or less degree a fly-protector, lessening the use of the tail as a brush or lash. The rein-guard may likewise be made chiefly of gum-elastic in the form and used in the manner of the frame A and its appendages. This comprises the whole apparatus as reduced to practice by me. The guard may of course be decorated with tassels or otherwise, to suit the fancy, and thus become an ornamental as well as a useful attachment.

The operations and use of the guard, as improved and applied by my invention, are as follows: When the horse throws up his tail, either through restiveness, viciousness, or to drive away flies, it strikes against the under side of the frame and throws it up and the reins or lines with it, whether they are taut or slack, and no matter how long the tail may be the horse cannot catch the reins therewith, no matter what are his efforts.

As before stated, the guard, when covered as described, also serves as a protector against flies for that part of the horse to which it is applied, and when the eye or eyes G and G' are attached and the reins are passed through one or both, the rear part of the guard rests thereon when the said reins are drawn taut, and in rapid driving prevents the flapping of the same.

Having thus described my invention and its operation, what I claim therein as new, and desire to secure by Letters Patent of the United States, is—

1. The application of a light frame, plate, or guard to the rear part of the harness or horse, or to the reins or lines, when said frame, plate, or guard shall extend over a part or the whole of the horse's dock, and over or through which said frame, plate, or guard the reins or lines pass.

2. The combination of the frame A with the loop B or its equivalent, as and for the purposes described, and this whether the said frame be covered with cloth or net-work or not, or whether the said frame be made wholly or in part of india-rubber or other elastic gum.

3. The frame A and loop B, in combination with the eye or eyes G and G', either with or without the cloth or net-work covering I, substantially as and for the purposes set forth.

In testimony whereof I have hereunto set my hand this 16th day of October, A. D. 1862.

GUY C. WORTH.

Witnesses:
    A. M. HOLLABAUGH,
    JOHN REGAN.